US012747749B2

(12) United States Patent
Silva et al.

(10) Patent No.: US 12,747,749 B2
(45) Date of Patent: Sep. 29, 2026

(54) SELF-FEED BIT SYSTEM

(71) Applicant: Black & Decker Inc., New Britain, CT (US)

(72) Inventors: Miguel Lahr Da Silva, Carlos Barbosa (BR); Ricardo Casagranda Dendena, Garibaldi (BR); Aland Santamarina, Woodbine, MD (US)

(73) Assignee: Black & Decker Inc.

( * ) Notice: Subject to any disclaimer, the term of this patent is extended or adjusted under 35 U.S.C. 154(b) by 446 days.

(21) Appl. No.: 18/485,533

(22) Filed: Oct. 12, 2023

(65) Prior Publication Data

US 2024/0125346 A1 Apr. 18, 2024

Related U.S. Application Data

(60) Provisional application No. 63/379,456, filed on Oct. 14, 2022.

(51) Int. Cl.
*F16B 23/00* (2006.01)
*F16B 25/00* (2006.01)
*F16B 25/10* (2006.01)

(52) U.S. Cl.
CPC ...... *F16B 23/0084* (2013.01); *F16B 23/0046* (2013.01); *F16B 25/103* (2013.01); *F16B 25/0078* (2013.01)

(58) Field of Classification Search
CPC ...................................................... B27G 15/00
See application file for complete search history.

(56) References Cited

U.S. PATENT DOCUMENTS

| | | | | |
|---|---|---|---|---|
| 21,179 | A | 8/1858 | Barnes | |
| 565,500 | A * | 8/1896 | Pearl | B23B 51/0072 408/25 |
| 646,439 | A | 4/1900 | Lavigne | |
| 2,576,376 | A | 11/1951 | Wilson | |
| 2,577,986 | A | 12/1951 | Wilson | |
| 2,577,987 | A | 12/1951 | Wilson | |
| 2,593,823 | A | 4/1952 | Wilson | |
| 2,618,304 | A | 11/1952 | Wilson | |
| 2,883,888 | A | 4/1959 | Stewart | |
| 2,962,066 | A | 11/1960 | Deliso | |

(Continued)

FOREIGN PATENT DOCUMENTS

| | | | | |
|---|---|---|---|---|
| GB | 602943 | A | 6/1948 | |
| GB | 674018 | A | 6/1952 | |
| GB | 2508828 | A * | 6/2014 | A01G 23/067 |

*Primary Examiner* — Jacob J Cigna
(74) *Attorney, Agent, or Firm* — Dickinson Wright PLLC

(57) ABSTRACT

A self-feed bit system includes a shank extending along an axis and configured to be coupled to a tool holder of a power tool and a cutting head couplable to the shank and including a sector shaped base. A radially extending lip is at a leading edge of the sector shape facing in a cutting direction and includes a rake face facing the cutting direction at a rake angle relative to the axis. A radially extending cutting blade is coupled to the radially extending lip and extends axially forward from the base at a first height. An at least partially threaded tip is coupled to the shank and extends axially forward of the cutting blade. Two or more teeth are positioned on a perimeter of the base trailing the cutting blade. Each tooth extends axially forward from the base at a second height that is less than the first height.

20 Claims, 17 Drawing Sheets

(56) References Cited

U.S. PATENT DOCUMENTS

| | | | | |
|---|---|---|---|---|
| 3,945,753 | A * | 3/1976 | Byers | B27G 15/00 408/214 |
| 4,012,970 | A | 3/1977 | Hintz et al. | |
| 4,050,841 | A | 9/1977 | Hildebrandt | |
| 4,090,807 | A | 5/1978 | Stewart | |
| 4,095,491 | A | 6/1978 | Hildebrandt | |
| 4,199,060 | A | 4/1980 | Howard | |
| 4,239,427 | A | 12/1980 | Walton, II | |
| 4,244,667 | A * | 1/1981 | Timmons | B27G 15/00 408/214 |
| 5,193,951 | A | 3/1993 | Schimke | |
| 6,652,202 | B2 | 11/2003 | Remke et al. | |
| 7,625,160 | B2 | 12/2009 | Zeiler et al. | |
| 7,661,911 | B2 | 2/2010 | Zeiler et al. | |
| 7,909,547 | B2 | 3/2011 | Jordan et al. | |
| 8,070,397 | B2 | 12/2011 | Durfee | |
| 8,070,398 | B2 | 12/2011 | Durfee | |
| 8,109,700 | B2 | 2/2012 | Jordan et al. | |
| 8,328,477 | B2 | 12/2012 | Allen et al. | |
| 8,371,777 | B2 | 2/2013 | Allen et al. | |
| 8,376,665 | B2 | 2/2013 | Kirby | |
| 8,646,601 | B2 | 2/2014 | Green et al. | |
| 8,727,679 | B2 | 5/2014 | Thomas | |
| 9,067,313 | B2 | 6/2015 | Green et al. | |
| 9,339,874 | B2 | 5/2016 | Allen et al. | |
| 9,919,364 | B2 | 3/2018 | Allen et al. | |
| 10,618,119 | B2 | 4/2020 | Allen et al. | |
| 2004/0020809 | A1 | 2/2004 | Allan et al. | |
| 2005/0072701 | A1 | 4/2005 | Allan et al. | |
| 2012/0134760 | A1 | 5/2012 | Jordan et al. | |

* cited by examiner

SELF-FEED BIT SYSTEM

RELATED APPLICATION

This application claims priority, under 35 U.S.C. § 119(e) to U.S. Provisional Application No. 63/379,456, filed Oct. 14, 2022, titled "Self-Feed Bit Systems and Related Cutting Heads and Self Feed Bits," which is incorporated by reference in its entirety.

FIELD

This present application relates generally to a self-feed bit system.

BACKGROUND

Self-feed bits may be used for cutting holes in materials, such as wood for passing pipe or conduit through the hole, and other applications. These types of bits generally include a shank that has one end adapted to be connected to, for example, a chuck of a rotary tool such as a drill or power driver. The opposite end of the shank supports a cutting head having an annular cutting edge. A screw tip may be provided for feeding a cutting member into and through the wood. A cutting member may be disposed between the cutting edge and the tip. The bit may be rotated at high speed such that the teeth score the edge of the hole, and the cutting member bores the interior of the hole. While various types of self-feed bits are available, improved self-feed bits and related systems that use self-feed bits are desired.

SUMMARY

Some embodiments of the present application provide a self-feed bit system including a shank extending along an axis and configured to be coupled to a tool holder of a power tool and a cutting head couplable to the shank and including a sector shaped base. A radially extending lip is at a leading edge of the sector shape facing in a cutting direction and includes a rake face facing the cutting direction at a rake angle relative to the axis. A radially extending cutting blade is coupled to the radially extending lip and extends axially forward from the base at a first height. An at least partially threaded tip is coupled to the shank and extends axially forward of the cutting blade. Two or more teeth are positioned on a perimeter of the base trailing the cutting blade. Each tooth extends axially forward from the base at a second height measured in an axial direction relative to a bottom of the base, the second height being less than the first height.

Implementations of these embodiments may include one or more of the following. The first height may be approximately one-half inch greater than the second height. The sector shaped base may extend around at least 180° and at most 300° of a circumference of a circle. The cutting blade may be removably coupled to the lip to facilitate replacement of the cutting blade. The at least partially threaded tip may be removably coupled to the shank. The at least partially threaded tip may include a thread having a pitch of less than or equal to 1.2 mm. The rake angle may be at least 40°. The teeth may comprise carbide or cermet. The cutting blade may comprise carbide or cermet. The cutting head may be integral with the shank. The cutting head may be removably coupled to the shank in a tool-free manner. The cutting head may comprise two or more removeable and interchangeable cutting heads having different diameters or features that are interchangeably coupleable to a front end of the shank. The cutting head may include a first threaded portion and the shank includes a second threaded portion that may be threadably attached to the first threaded portion to removably couple the cutting head to the shank. The first threaded portion may include a threaded stub extending axially rearward of the cutting head and the second threaded portion may include a threaded collar configured to be threaded to the threaded stub and coupled to the shank.

Other embodiments of the present application provide a self-feed bit system including a shank extending along an axis and configured to be coupled to a tool holder of a power tool, and a cutting head couplable to the shank and including a sector shaped base, a radially extending lip at a leading edge of the sector shape facing in a cutting direction, the lip including a rake face facing the cutting direction at a rake angle relative to the axis. A radially extending cutting blade is coupled to the radially extending lip and extends axially forward from the base at a first height measured in an axial direction relative to a bottom of the base. An at least partially threaded tip coupled to the shank and extending axially forward of the cutting blade. The cutting head is removably couplable to the shank in a tool-free manner.

Implementations of these embodiments may include one or more of the following. The cutting head may include a first threaded portion and the shank may include a second threaded portion that may be threadably attached to the first threaded portion to removably couple the cutting head to the shank. The first threaded portion may include a threaded stub extending axially rearward of the cutting head and the second threaded portion may include a threaded collar configured to be threaded to the threaded stub and coupled to the shank. The cutting head may include a plurality of removable and interchangeable cutting heads, and the system may further include a package inside of which the shank and the plurality of the one or more removable and interchangeable cutting heads are packaged with the plurality of cutting heads lying flat within the package.

Other embodiments of the present application provide a self-feed bit system including a shank extending along an axis and configured to be coupled to a tool holder of a power tool, and a cutting head couplable to the shank and including a sector shaped base, and a radially extending lip at a leading edge of the sector shape facing in a cutting direction. The lip includes a rake face facing the cutting direction at a rake angle relative to the axis, wherein the rake angle is at least 40°. A radially extending cutting blade is coupled to the radially extending lip and extends axially forward from the base at a first height measured in an axial direction relative to a bottom of the base. An at least partially threaded tip is coupled to the shank and extends axially forward of the cutting blade wherein the at least partially threaded tip includes a thread having a pitch of less than or equal to 1.2 mm. Two or more teeth are positioned on a perimeter of the base trailing the cutting blade, each tooth extending axially forward from the base at a second height measured in an axial direction relative to a bottom of the base, wherein the teeth comprise carbide or cermet.

Implementations of these embodiments may include one or more of the following. The cutting head may be integral with the shank. The cutting head may be removably coupled to the shank in a tool-free manner. The cutting head may comprise two or more removeable and interchangeable cutting heads having different diameters or features that are interchangeably coupleable to a front end of the shank. The cutting head may include a first threaded portion and the shank includes a second threaded portion that may be threadably attached to the first threaded portion to removably couple the cutting head to the shank. The first threaded portion may include a threaded stub extending axially rearward of the cutting head and the second threaded portion may include a threaded collar configured to be threaded to the threaded stub and coupled to the shank.

Some embodiments of the present application provide self-feed bit systems including a shank extending along an axis and configured to be coupled to a tool holder of a power tool and a cutting head couplable to the shank. The cutting head includes a sector shaped base that extends around at least a majority and less than an entirety (e.g., at least 180 degrees and at most 300 degrees) of a circumference of a circle. The base is generally flat with an upwardly projecting and radially extending lip at a leading edge of the sector facing in a cutting direction. The lip includes an angled rake face facing a cutting direction and a radially extending locking groove that receives a removable and replaceable cutting blade. The cutting head includes two or more perimeter teeth positioned on the base that trail the removable and replaceable cutting blade and are at a lower height than the cutting blade.

In further embodiments, the cutting head may be removably couplable to the shank. In certain embodiments, the cutting head may be a first cutting head and the system may further include a second cutting head that is removably couplable to the shank and interchangeable with the first cutting head.

In still further embodiments, the cutting head may be integral with the shank.

In some embodiments, the two or more perimeter teeth may be at a lower height than the cutting blade to reduce friction and protect the two or more perimeter teeth from nail strikes. In certain embodiments, the cutting blade may be about one half inch higher than the two or more perimeter teeth in a vertical direction from a surface of the base.

In further embodiments, the sector shaped base may extend around at least 150 degrees and at most 300 degrees of the circumference of the circle.

In still further embodiments, the cutting blade may be held in the locking groove by a set screw.

In some embodiments, the shank may include a rear portion configured to be coupled to the tool holder of the power tool, an intermediate portion extending axially forward from the rear portion, a front portion extending axially forward from the intermediate portion and configured to be removably and non-rotatably couplable to the cutting head, and an at least partially threaded tip coupled to the front portion and extending axially forward of the cutting blade.

In further embodiments, the rear portion may have a polygonal cross-section.

In still further embodiments, the intermediate portion may be generally cylindrical.

In some embodiments, the threaded tip may be removably coupled to the front portion. In certain embodiments, the front portion may have a non-circular cross section and the cutting head may have a central opening with a non-circular cross section that is configured to non-rotatably receive the front portion. In further embodiments, the non-circular cross section of the front portion may have a double-D shape and the non-circular cross section of the central opening may have a double-D shape.

In further embodiments, the cutting head may further include an externally threaded stub extending axially rearward from a center of an underside of the base.

In still further embodiments, the cutting head may include one or more removeable and interchangeable cutting heads that include a plurality of different cutting heads having different diameters or features that are interchangeably attachable to a front end of the shank.

In some embodiments, the shank may include a generally cylindrical collar that is threadably couplable to the threaded stub for removably coupling the cutting head to the shank. The collar may be axially retained on the shank by a ring received in an external annular groove in the intermediate portion of the shank and in an internal annular groove in the collar.

In further embodiments, the collar may be a hollow cylinder and may include internal threads inside a front end. The internal threads may be configured to mate with external threads on the threaded stub of the cutting head.

In still further embodiments, the collar may have a knurled outer surface to facilitate gripping by a user.

In some embodiments, the cutting head may include a plurality of removable and interchangeable cutting heads. The system may further include a compact package inside of which the shank and the plurality of the one or more removable and interchangeable cutting heads are packaged with the plurality of cutting heads lying flat within the package.

In further embodiments, a single cutting head is fixed to a single shank.

In still further embodiments, the cutting head may be removeable and interchangeable and may not be fixed to the shank.

In some embodiments, the removable and interchangeable cutting head may be attached to the shank without use of a collar.

Further embodiments of the present application provide self-feed bit systems including a shank extending along an axis and a cutting head. The cutting head has at least two sector-shaped base walls configured to be couplable to the shank, each extending at most approximately 90° (e.g., from about 20 degrees to about 45 degrees) around a circumference of a circle and together do not complete a 360 circumference of the circle. Each of the at least two sector-shaped base walls are bounded by a radial wall extending forward from the base and facing a cutting direction with a radial cutting edge disposed on the radial wall, and a peripheral wall extending forward from the base and including a cutting spur at a leading corner of a peripheral wall facing in a cutting direction, the cutting spur extending axially forward of the radial cutting edge.

In still further embodiments, the shank may further include a rear portion configured to be coupled to the tool holder of the power tool, an intermediate portion extending axially forward from the rear portion, a front portion extending axially forward from the intermediate portion and configured to be removably and non-rotatably couplable to the cutting head, and an at least partially threaded tip coupled to the front portion and extending axially forward of the spurs.

In some embodiments, each of the radial walls may include angled rake faces. Each of the angled rake faces may have a radial cutting edge. Each radial cutting edge may be one of integral with an angled rake face or a separate blade that is removably attached to the angled rake face.

In further embodiments, a center of the cutting head may include a circular central opening to receive the shank.

In still further embodiments, the cutting head and the shank may be permanently affixed together. The cutting head and the shank may be permanently affixed together by one of press fitting, welding, and brazing.

In some embodiments, the system may further include a package including a set of the self-feed bits that are packaged in an alternating nested pattern in the package to reduce volume of the package. Self-feed bit systems may include a shank extending along an axis and configured to be coupled to a tool holder of a power tool and a cutting head couplable to the shank. The cutting head includes a sector shaped base that extends around at least a majority and less than an entirety (e.g., at least 180 degrees and at most 300 degrees) of a circumference of a circle. The base is generally flat with an upwardly projecting and radially extending lip at a leading edge of the sector facing in a cutting direction. The lip includes an angled rake face facing a cutting direction and a radially extending locking groove that receives a removable and replaceable cutting blade. The cutting head further includes an externally threaded stub extending axially rearward from a center of an underside of the base and the shank includes a generally cylindrical collar that is threadably couplable to the threaded stub for removably coupling the cutting head to the shank.

Still further embodiments of the present application provide a cutting head couplable to a shank extending along an axis and configured to be coupled to a tool holder of a power tool. The cutting head includes a sector shaped base that extends around at least a majority and less than an entirety (e.g., at least 180 degrees and at most 300 degrees of a circumference of a circle. The base is generally flat with an upwardly projecting and radially extending lip at a leading edge of the sector facing in a cutting direction. The lip includes an angled rake face facing a cutting direction and a radially extending locking groove that receives a removable and replaceable cutting blade. The cutting head includes two or more perimeter teeth positioned on the base that trail the removable and replaceable cutting blade and are at a lower height than the cutting blade.

Advantages may include one or more of the following. The self-feed bits discussed herein may have cutting heads that are more durable, have longer life, are more efficient, have reduced torque, and/or have greater cutting speed. Furthermore, the cutting heads may be removable and interchangeable with a more efficient attaching system. These and other advantages and features will be apparent from the description and the drawings.

DETAILED DESCRIPTION

As discussed above, self-feed bits may be used for cutting holes in materials, such as forming holes in wood to receive pipe, conduit, and for other applications. These types of bits generally include a shank that has one end adapted to be connected to, for example, a chuck of a rotary tool such as a drill or power driver. While various types of self-feed bits are known, improved self-feed bits and related systems that used self-feed bits are desired.

Accordingly, embodiments of the present application provide self-feed bits and related cutting heads and systems that may be more durable, have longer life, may be more efficient, may have lower torque, and/or may have greater cutting speed than conventional bits and systems. For example, in some embodiments of the present application, a cutting head is provided that is designed to provide protection to perimeter teeth from nail strikes and, therefore, may prolong the life of the cutting head itself. Further embodiments provide a system that includes a threaded collar that facilitates attaching the cutting head to the shank. These example embodiments and details of further embodiments will be discussed herein with respect to FIGS. 1 through 12.

Figure 1:
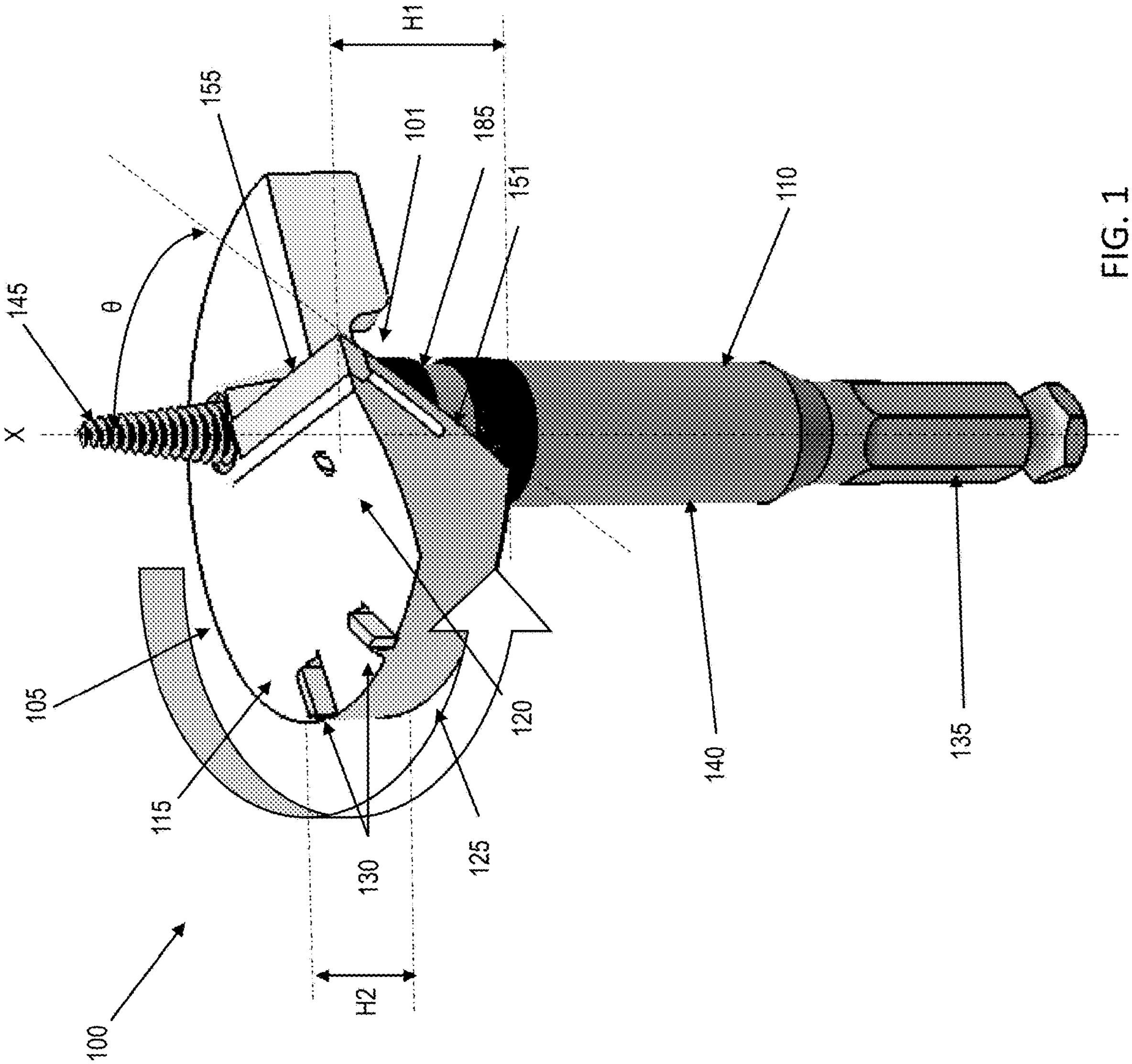
FIG. 1 is a perspective view of a self-feed bit system in accordance with some embodiments of the present application.

Referring first to FIG. 1, a perspective view of a self-feed bit system 100 in accordance with some embodiments of the present application will be discussed. As illustrated, the self-feed bit system 100 includes a cutting head 105 that is positioned on a shank 110. The shank 110 is configured to be coupled to a tool holder of a power tool (not shown) allowing the cutting head 105 to create a hole in a workpiece. As will be discussed further herein, the shank 110 may be fixed to or integral with the cutting head 105 in some embodiments. However, in some embodiments, the cutting head 105 may be removeable and interchangeable in a tool-free manner (e.g., without the use of a secondary tool). In particular, different cutting heads 105 may be positioned on a same shank 110 and used to create holes of various sizes without departing from the scope of the present application. Various methods may be used to couple the various cutting heads 105 to the shank as will be discussed further herein.

Referring again to FIG. 1, the cutting head 105 includes a sector shaped base 115 that extends around at least a majority and less than an entirety (e.g., at least 180 degrees and at most 300 degrees) of a circumference of a circle. In some embodiments, the circumference of the circle may be from about 150° to about 300°. However, embodiments are not limited thereto. As illustrated, the base 115 may be generally flat with an upwardly projecting and radially extending lip 120 at a leading edge of the sector facing in a cutting direction 125. The lip 120 includes an angled rake face 151 facing a cutting direction 125 and a radially extending locking groove (150, FIG. 2A) that receives a removable and replaceable cutting blade 155. The rake face 151 is at a rake angle θ to a longitudinal axis X of the shank 110. The rake angle θ is greater than the rake angle in know self-feed bits (e.g., at least 40° as compared to approximately 35° in known self-feed bits), which helps reduce the amount of torque needed to drive the self-feed bit through a workpiece. The cutting blade 155 is disposed at a first height H1 relative to the bottom of the base 115. In addition, the cutting blade 155 may be made of a hard metal, such as carbide or cermet, to increase the life of the blade 135 and the self-feed drill bit. It will be understood that the cutting blade 155 is generally replaceable, but embodiments of the present application are not limited thereto. The cutting blade 155 may be fixed without departing from the scope of the present application.

As further illustrated in FIG. 1, the cutting head 105 further includes two or more perimeter teeth 130 positioned on the base 115 that trail the removable and replaceable cutting blade 155. The two or more perimeter teeth 130 are disposed on the perimeter of the base 114 are at a second height H2 relative to the bottom of the base 115. The second height H2 of the perimeter teeth 130 is lower than the first height H1 of the cutting blade 155. The perimeter teeth 130 may be made of a hard metal, such as carbide or cermet, to increase the life of the teeth 130 and the self-feed drill bit.

Figure 2A:
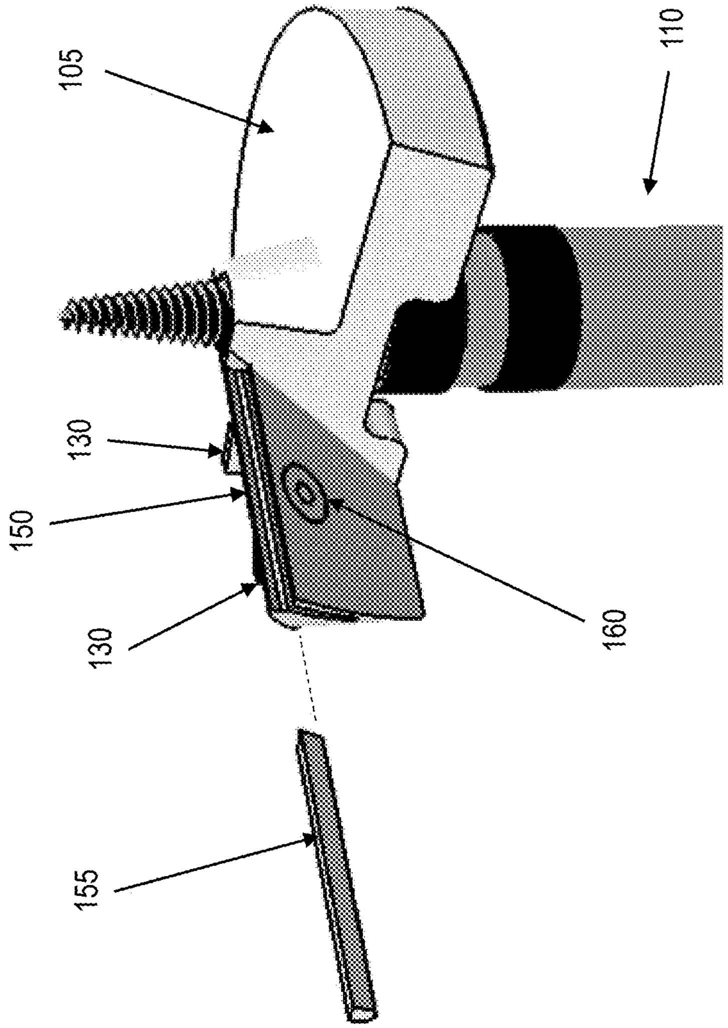
FIG. 2A is a perspective view of the cutting head of the self-feed bit system of FIG. 1 having a cutting blade removed therefrom in accordance with some embodiments of the present application.
Figure 2B:
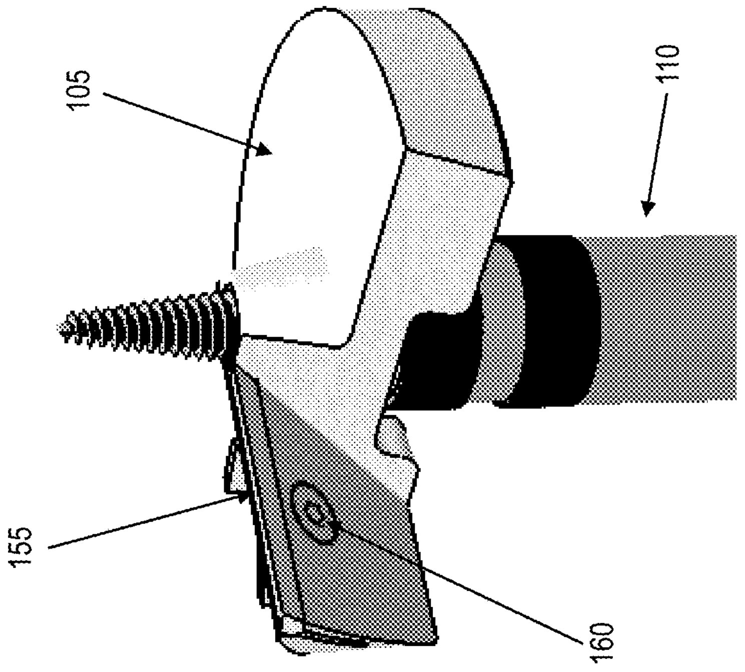
FIG. 2B is a perspective view of the cutting head of the self-feed bit system of FIG. 1 having the cutting blade positioned thereon in accordance with some embodiments of the present application.

Referring now to FIGS. 2A and 2B, perspective views of the cutting head in accordance with some embodiments of the present application will be discussed. As illustrated in FIGS. 2A, the two or more perimeter teeth 130 may be at a lower height than the cutting blade 155 in some embodiments to reduce friction and protect the two or more perimeter teeth 130 from nail strikes. This lower height H2 also allows the cutting blade 155 to make the initial cut and removal of the material, while the perimeter teeth 130 clear chips and result in a smoother finished edge of the hole formed in the workpiece. For example, the height H1 of the cutting blade 155 may be about one half inch higher than the height H2 of the two or more perimeter teeth 130.

As illustrated in FIGS. 2A and 2B, the cutting blade 155 may be held in the locking groove 150 by a set screw 160. The provision of the set screw 160 allows the cutting blade 155 to be easily replaced by loosening and tightening the set screw. It should be understood that more than one set screw may be employed without departing from the scope of the present application.

Referring again to FIG. 1, the shank 110 may include a rear portion 135, an intermediate portion 140 extending axially forward from the rear portion 135, a front portion (365, FIG. 3A) extending axially forward from the intermediate portion 140, and an at least partially threaded tip 145 coupled to the front portion 365. The at least partially threaded tip 145 has a thread pitch that is less than that used on threaded tips in known self-feed bits. The thread pitch is the distance between threads measured along the axis X. For example, the thread pitch of the tip 145 may be 1.2 mm or less, while known self-feed bits may have a thread pitch of 1.6 mm or greater. This lower thread pitch reduces the amount of toque needed for the self-feed bits to drill into a workpiece.

The rear portion 135 is configured to be coupled to the tool holder of the power tool (not shown). The front portion (365, FIG. 3A) may be configured to be removably and non-rotatably couplable to the cutting head 105. The at least partially threaded tip 145 may extend axially forward of the cutting blade 155. The threaded tip 145 may be fixed to or removably coupled to the front portion in various embodiments.

Referring now to FIGS. 1 through and 3B, the rear portion 135 may have a polygonal cross-section. The cross section illustrated in FIG. 1 is a "hex" shape, however, embodiments of the present application are not limited thereto. The intermediate portion 140 may be generally cylindrical.

Figure 3A:
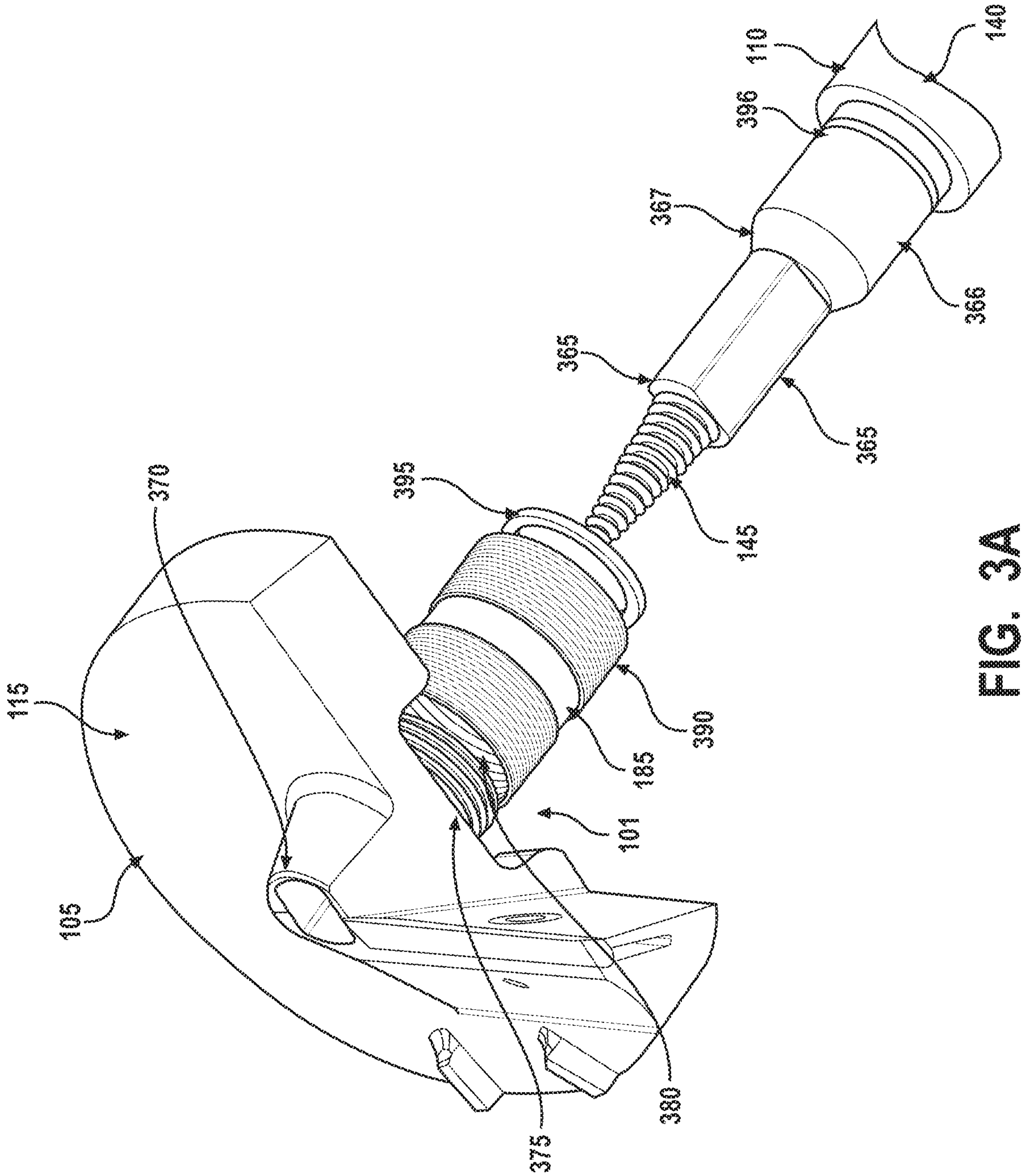
FIG. 3A is top perspective view of the self-feed bit system of FIG. 1 illustrating positioning of the cutting head on a shank in accordance with some embodiments of the present application.
Figure 3B:
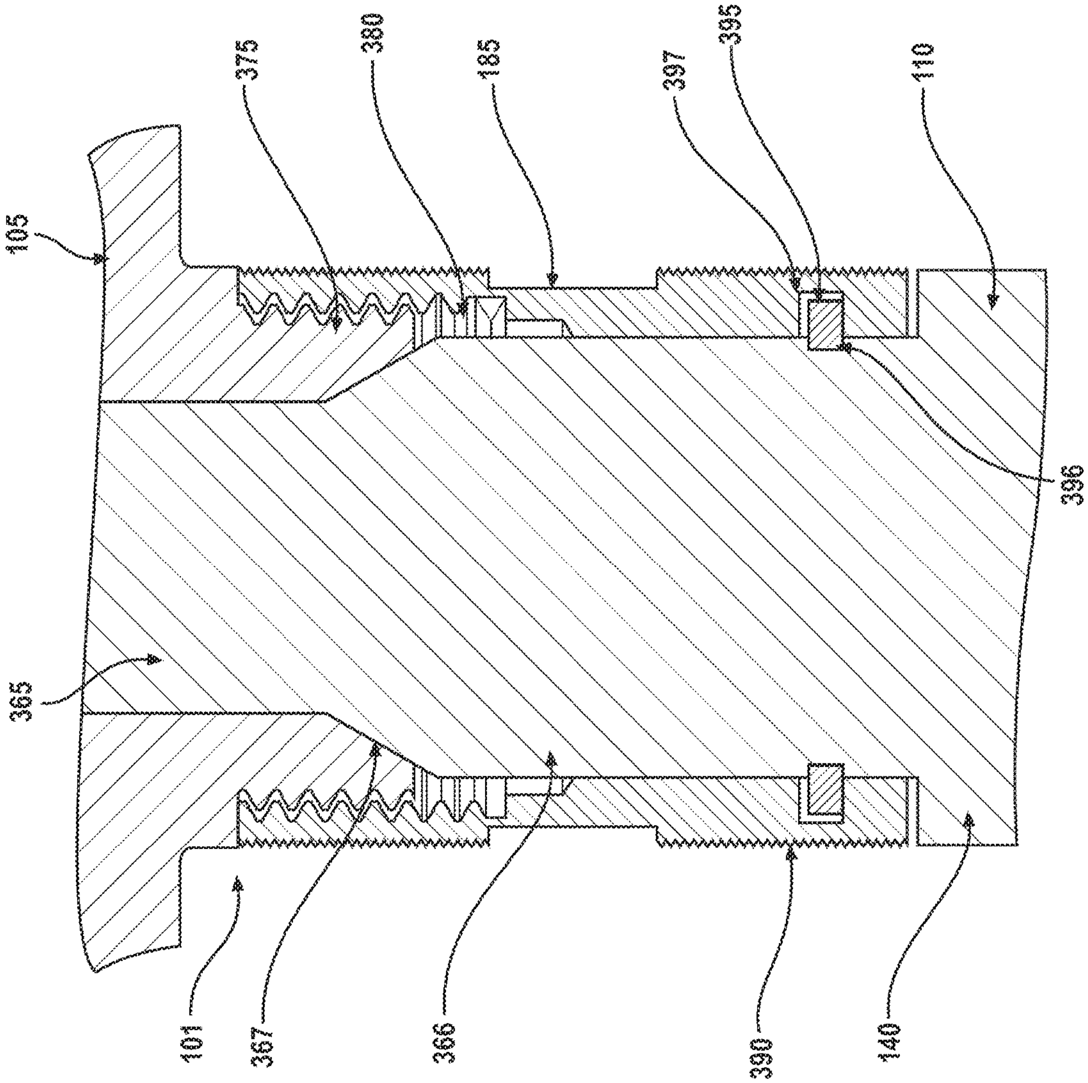
FIG. 3B is a cross section of a portion of the self-feed bit system of FIG. 1, illustrating coupling between the cutting head and the shank in accordance with some embodiments of the present application.

The front portion 365 has a non-circular cross section and the cutting head 105 has a central opening 370 with a non-circular cross section that is configured to receive the front portion. As illustrated in FIG. 3A, in some embodiments the non-circular cross section of the front portion 365 has a "double-D" shape and the non-circular cross section of the central opening 370 has a "double-D shape." The "double D" shapes portions appearing like two "Ds" back to back. It will be understood that embodiments are not limited to this configuration. In some embodiments, as shown, the front portion may have two portions including a small generally cylindrical portion 366 and a non-circular front portion 365. The small generally cylindrical portion 366 is smaller than the generally cylindrical intermediate portion 140. Furthermore, a conical surface 367 is provided between the small diameter cylindrical front portion and the double-D shaped front portion.

As further illustrated in FIG. 3A, the cutting head 105 and the shank 110 may be removably coupled to each other in a tool-free manner by a tool-free attachment mechanism 101. In one embodiment of a tool-free attachment mechanism 101, the cutting head 105 may further include an externally threaded stub 375 extending axially rearward from a center of an underside of the base 115. In some embodiments, the shank 110 may include a generally cylindrical collar 185 that is threadably couplable to the threaded stub 375 for removably coupling the removable and interchangeable cutting heads 105 to the shank 110. It will be understood that all parts of the shank and cutting head can be fixed (i.e., non-removeable and interchangeable) without departing from the scope of the present application.

Figure 4A:
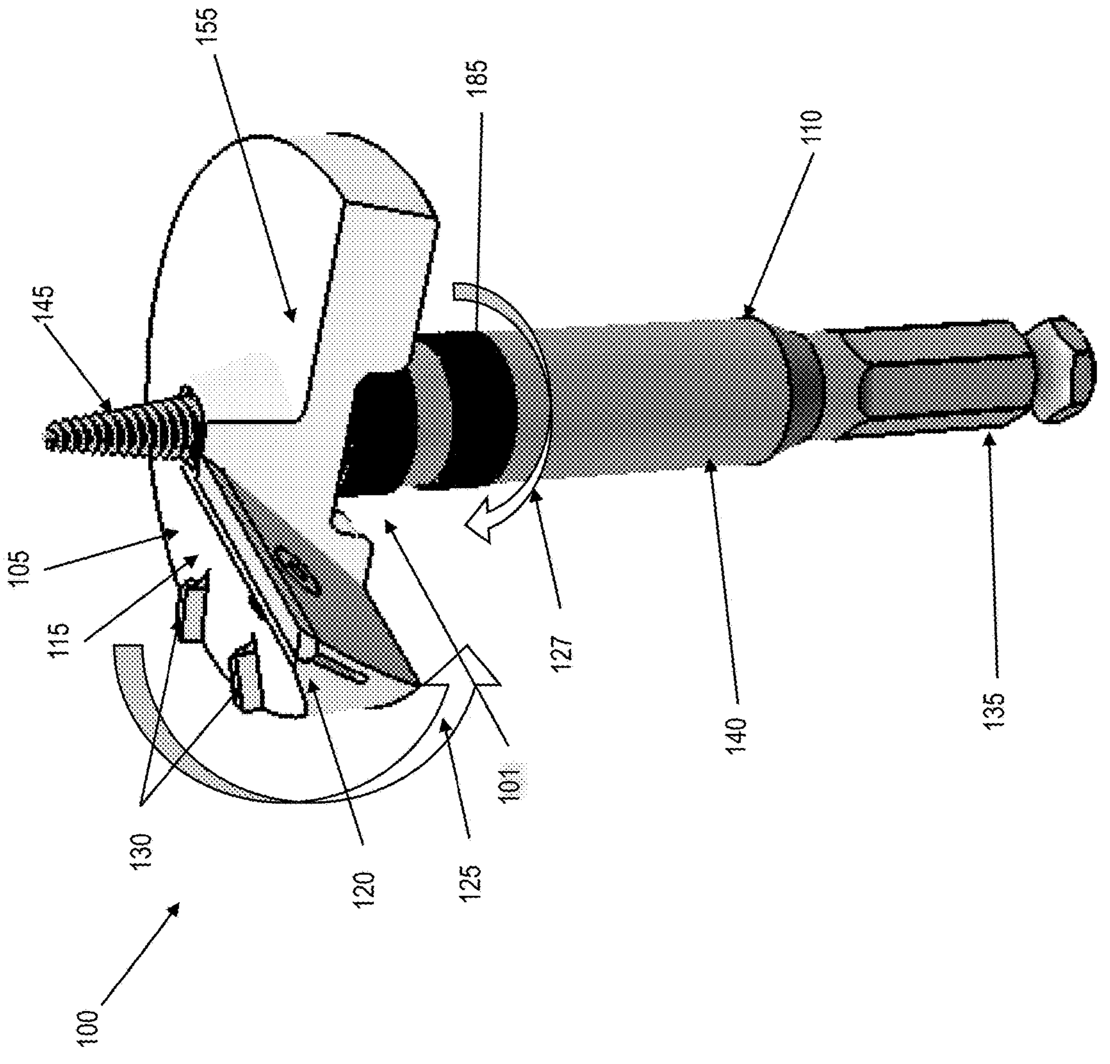
FIGS. 4A and 4B are perspective views of the self-feed bit system illustrating positioning of a cutting head on a shank in accordance with some embodiments of the present application.
Figure 4B:
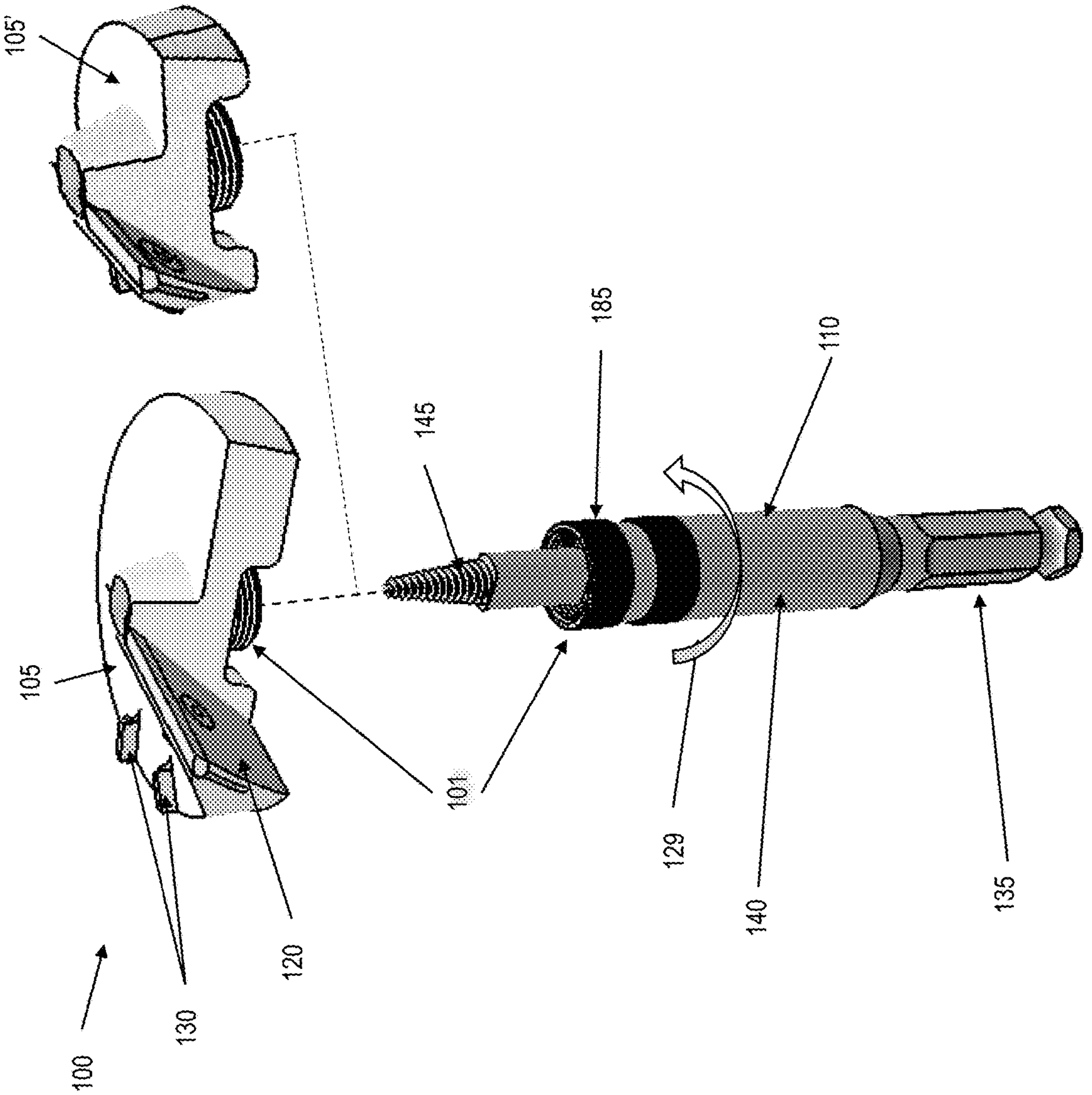

Referring now to FIGS. 4A and 4B, diagrams of the system illustrating loosening and tightening the collar 185 in accordance with some embodiments of the present application will be discussed. As illustrated in FIG. 4A, to loosen the collar 185, the collar is rotated in a loosening direction 127 opposite from the cutting direction 125. Similarly, to tighten the collar 185, the collar is rotated in a tightening direction 129 that is the same as the cutting direction 125. FIG. 4B further illustrates a larger cutting head 105 being replace with a smaller cutting head 105'. It will be understood that the loosening and tightening directions may be swapped without departing from the scope of the present application.

Referring now to FIGS. 4A and 4B, diagrams of the system illustrating loosening and tightening the collar 185 in accordance with some embodiments of the present application will be discussed. As illustrated in FIG. 4A, to loosen the collar 185, the collar is rotated in aa loosening direction 127 opposite from the cutting direction 125. Similarly, to tighten the collar 185, the collar is rotated in a tightening direction 129 that is the same as the cutting direction 125. FIG. 4B further illustrates a larger cutting head 105 being replace with a smaller cutting head 105'. It will be understood that the loosening and tightening directions may be swapped without departing from the scope of the present application.

In practice, to install a cutting head 105 on the shank 110, the opening on the cutting head is aligned with the front end of the shank and the front end of the shank is inserted through the central opening in the cutting head. The collar is then rotated in the tightening direction 129 (which in this case is the same direction as the cutting direction 125) and the threads on the collar engage the threads on the stub and pull the cutting head rearward onto the shank. To remove and interchange the cutting heads, the collar is rotated in the opposite loosening direction 127 and the cutting head is removed axially from the shank.

It will be understood that although some embodiments discussed herein include a collar to facilitate attachment of the shank to the cutting head, embodiments of the present application is not limited thereto. In particular, in embodiments having a removable and interchangeable cutting head, the shank may be attached to the cutting head without use of a collar (e.g., FIG. 7B).

As discussed above, the shank, cutting head, the threaded tip, and the cutting blade may be integrated into fewer pieces or may be separated into additional separate pieces. Various systems with different levels of integration will now be discussed.

Figure 5B:
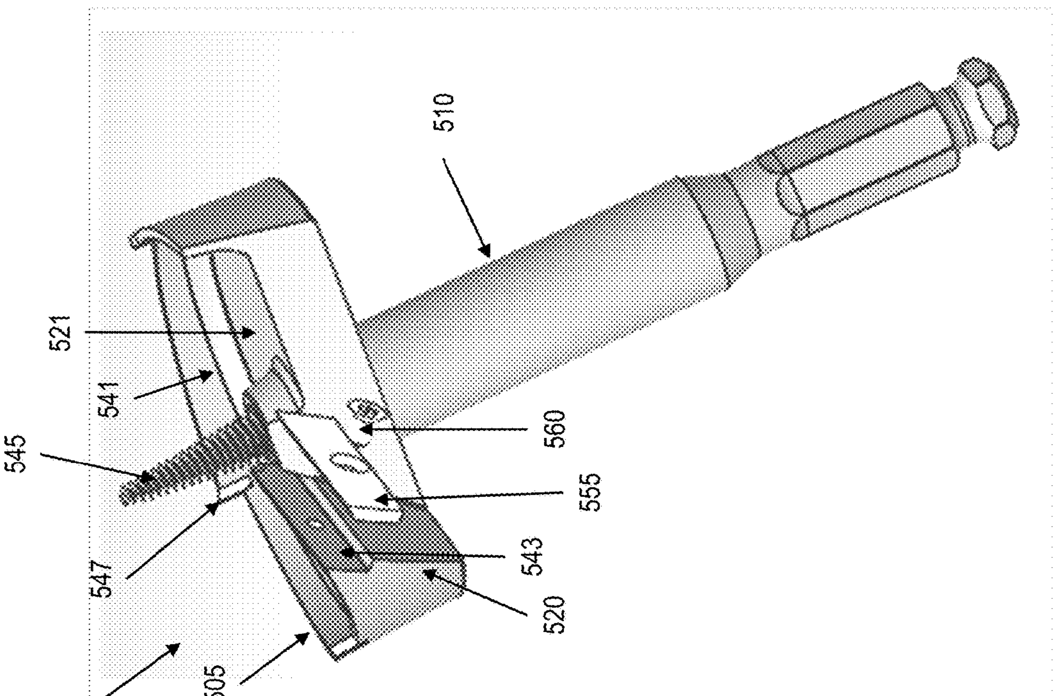
FIGS. 5A and 5B are perspective views of another embodiment of a self-feed bit system having a fixed shank, fixed feed screw, and removable blade in accordance with some embodiments of the present application.
Figure 5A:
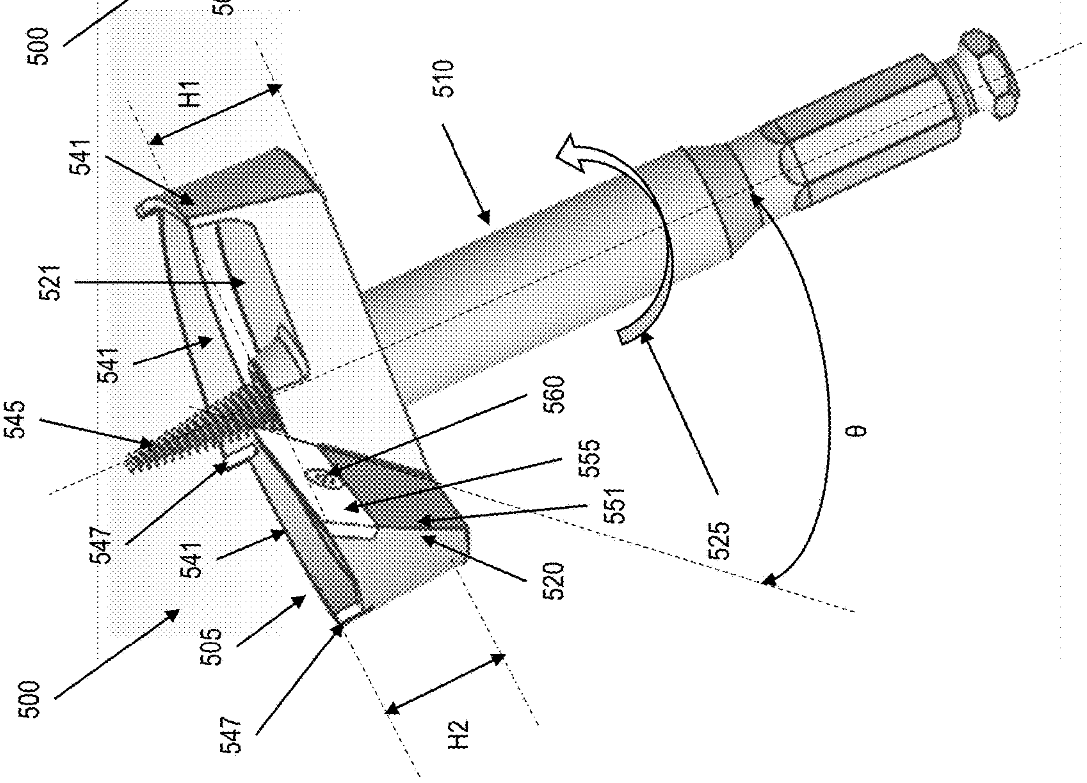

FIGS. 5A and 5B illustrate another embodiment of a self-feed bit system 500 having a shank 510, a cutting head 505, a threaded tip 545, and a cutting blade 555. The shank 510 and threaded tip 545 are integrally attached to each other and to the cutting head 505. The shank 510 and the threaded tip 545 are otherwise similar to the shank 110 and threaded tip 145 of self-feed bit system of FIG. 1. The cutting head 505 differs from the cutting head 105 in the following aspects. The cutting head 505 includes a sector shaped base 515 (e.g., extending a majority (e.g., approximately 150° to about 300° about a circumference of a circle, and a plurality of peripheral walls 541 extending axially forward of the base wall 515 to define a cavity 521 in the cutting head 505. Each peripheral wall 541 is slanted or tapered downward in a direction opposite the cutting direction 525.

A radial lip 520 extends radially outward from the shank 510 to the peripheral wall 541. The cutting blade 555 is received in a recess 543 in the lip 520 and attached by a set screw 560, which provide ease of replacement. The lip 520 includes an angled rake face 551 facing the cutting direction 525. The rake face 551 is at a rake angle θ to a longitudinal axis X of the shank 510. The rake angle θ is greater than the rake angle in known self-feed bits (e.g., at least 40° as compared to approximately 35° in known self-feed bits), which helps reduce the amount of torque needed to drive the self-feed bit through a workpiece. The cutting blade 555 is disposed at a first height H1 relative to the bottom of the base 515. In addition, the cutting blade 555 may be made of a hard metal, such as carbide or cermet, to increase the life of the blade 535 and the self-feed drill bit.

Each peripheral wall 541 is formed with a perimeter tooth 547 that trails the cutting blade 555 in the cutting direction 525. The perimeter teeth 547 are disposed on the perimeter of the base 515 are at a second height H2 relative to the bottom of the base 515. The second height H2 of the perimeter teeth 547 is lower than the first height H1 of the cutting blade 555. The perimeter teeth 547 may be made of a hard metal, such as carbide or cermet, to increase the life of the teeth 547 and the self-feed drill bit.

Figure 6B:
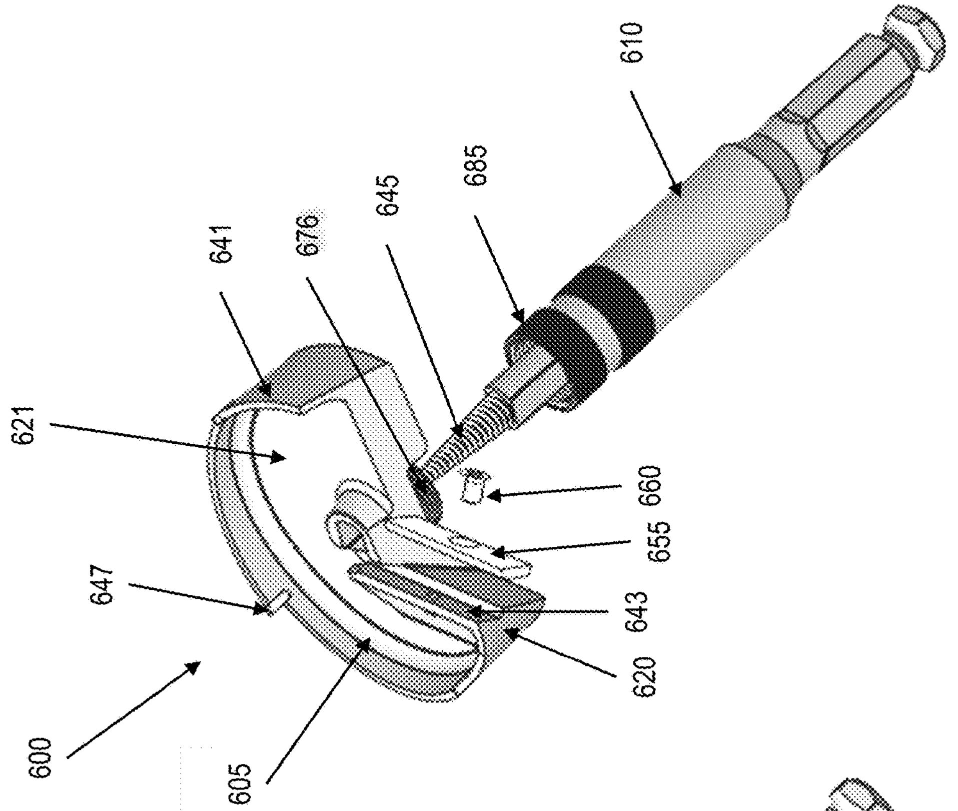
FIGS. 6A and 6B are perspective views of another embodiment of a self-feed bit system having a removable shank and removable blade in accordance with some embodiments of the present application.
Figure 6A:
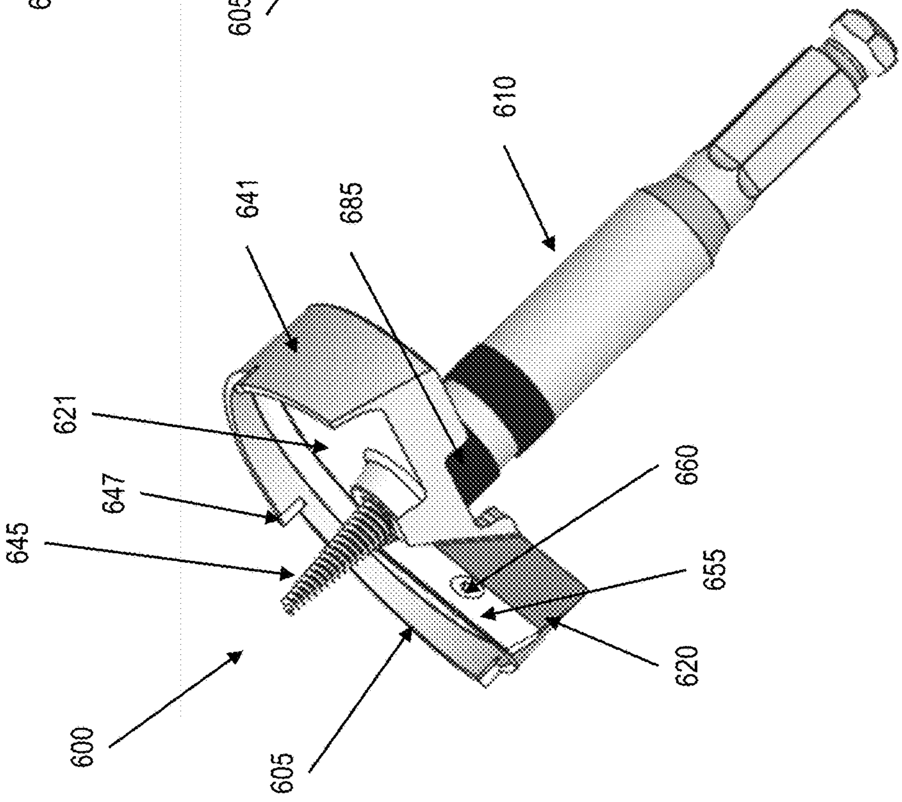

FIGS. 6A and 6B illustrate another embodiment of a self-feed bit system 600 having a shank 610, a cutting head 605, a threaded tip 645, and a cutting blade 655 that are substantially similar to the shank 510, cutting head 505, threaded tip 545, and cutting blade 555 of FIGS. 5A and 5B, with like elements having the same base numerals but with the prefix "5" replaced with a "6", except with the following differences. The shank 610 and threaded tip 645 are integrally attached to each other similar to the integrally attached shank 110 and threaded tip 145 described above with respect to FIG. 1. The shank 610 includes a threaded collar 685 similar to the threaded collar 185 on the shank 110 and the cutting head 605 has a threaded stub 676 similar to threaded stub 375 on cutting head 105, to removably couple the cutting head 605 to the shank 610 in the same manner as described above with respect to the embodiment of FIG. 1.

Figure 7B:
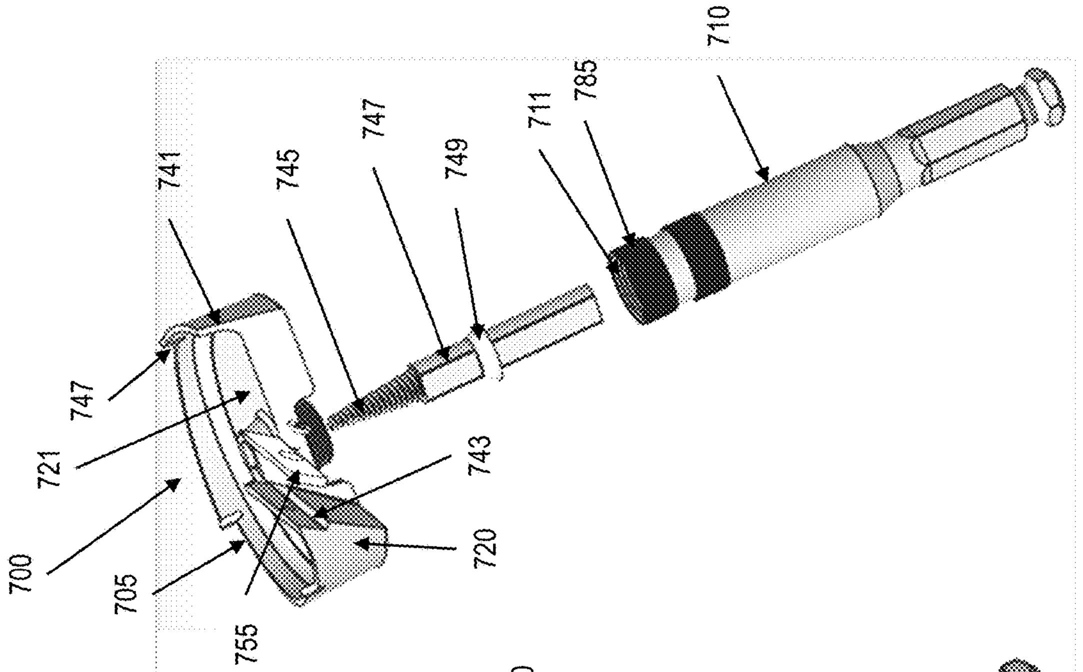
FIGS. 7A and 7B are perspective views of another embodiment of a self-feed bit system having a removable shank, removable main blade and removable feed screw with no tightening collar in accordance with some embodiments of the present application.
Figure 7A:
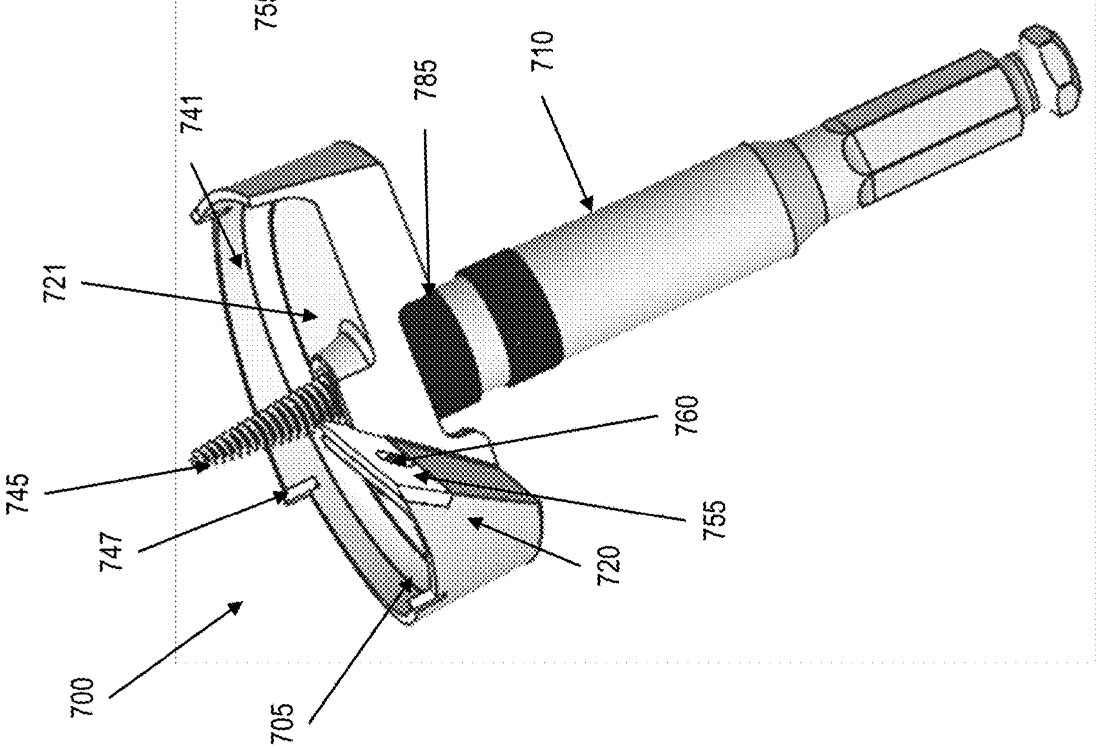

FIGS. 7A and 7B illustrate another embodiment of a self-feed bit system 700 having a shank 710, a cutting head 705, a threaded tip 745, and a cutting blade 755 that that are substantially similar to the shank 610, cutting head 605, threaded tip 645, and cutting blade 655 of FIGS. 6A and 6B, with like elements having the same base numerals but with the prefix "6" replaced with a "7", except with the following differences. In this embodiment, the threaded tip 745 is removable coupled to the shank 710. The threaded tip 745 includes a rearward projection 747 that is removably received in a front opening 711 of the shank 710, e.g., by a friction or interference fit of an O-ring 749 on the rearward projection 747.

Figure 8:
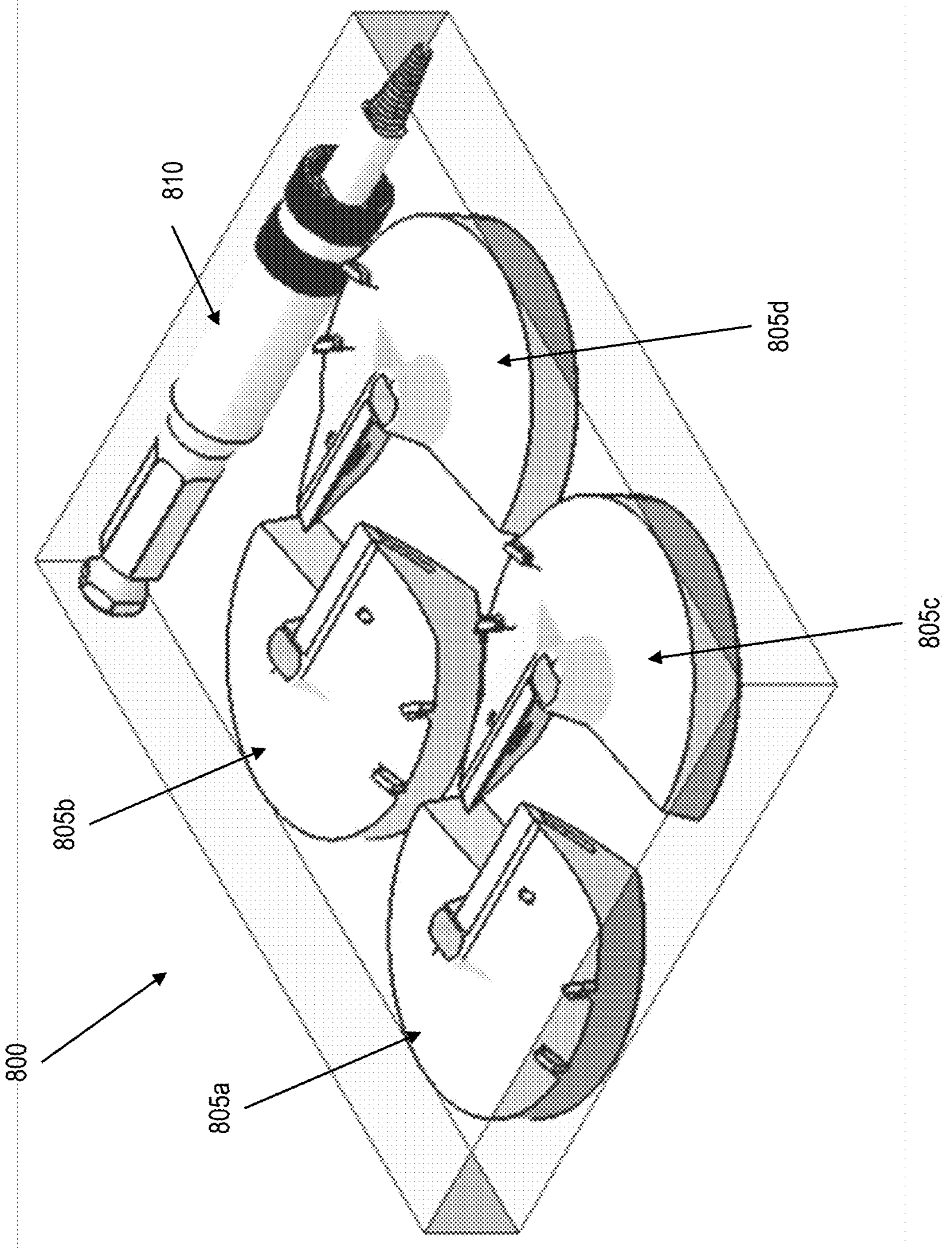
FIG. 8 is a perspective view illustrating packaging including a shank and multiple cutting heads in a package in accordance with some embodiments of the present application.

As illustrated in FIG. 8, in an embodiment, various elements of the system in accordance with embodiments discussed herein may be packaged together for convenience. In the embodiment of FIG. 8, a package 800 includes four cutting heads 805*a*, 805*b*, 805*c*, 805*d* and one shank 810 similar to the cutting heads 105, 505, 605, 705 and shanks 110, 510, 610, 710, respectively, described above. The cutting heads may of the same type of different types and sizes of cutting heads. The shank lies flat next to the generally flat cutting heads to reduce the overall height of the package. Furthermore, other items may be included in the packaging 800, for example, cutting blades, more than one shank, etc. Thus, various elements of the system may be included in a compact package.

As discussed above, embodiments of the present application, by provision of perimeter teeth of a lower height than the height of the cutting blade, may have greater durability, longer life, greater efficiency, and/or faster cutting speed. Furthermore, embodiments that provide a modular system that is easily assembled and disassembled using a threaded collar for removably attaching the head to the shank may facilitate greater usefulness and move compact packaging at a lower cost and with fewer parts.

Figure 9:
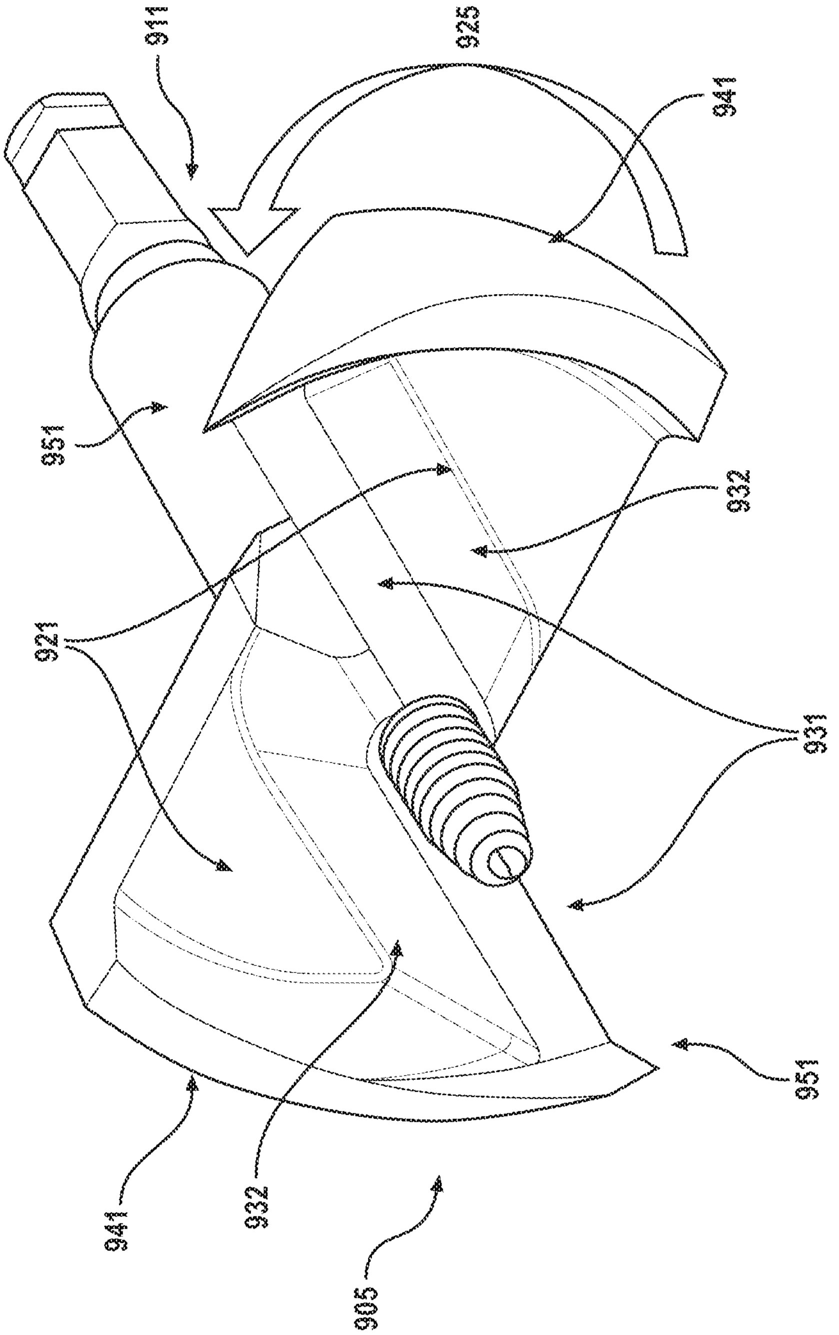
FIG. 9 a perspective view of a self-feed bit system in accordance with other embodiments of the present application.

Referring now to FIGS. 9 through 12, a self-feed bit system in accordance with further embodiments of the present application will be discussed. As illustrated in FIG. 9, the system 900 includes a shank 911 and a cutting head 906. The cutting head 905 includes two sector-shaped base walls 921 configured to be coupled to the shank 911. Each of the two sector-shaped base walls 921 may extend at most approximately 90° (e.g., from about 20° to about 45°) around a circumference of a circle and together do not complete a 360° circumference of the circle. It will be understood that although FIG. 9 illustrates two sector-shaped base walls, embodiments of the present application are not limited thereto. One or more than two sector-shaped base walls may be provided without departing from the scope of the present application.

As further illustrated in FIG. 9, each of the two sector-shaped base walls 921 are bounded by a radial wall 932 extending forward from the base 921 and facing a cutting direction 925 with a radial cutting edge (cutters) 931 disposed on the radial wall. The two-sector shaped base walls 921 further include a peripheral wall 941 extending forward from the base 921 and including a cutting spur 951 at a leading corner of a peripheral wall 941 facing in a cutting direction 925. The cutting spur 951 extends axially forward of the radial cutting edge 931.

Figure 10:
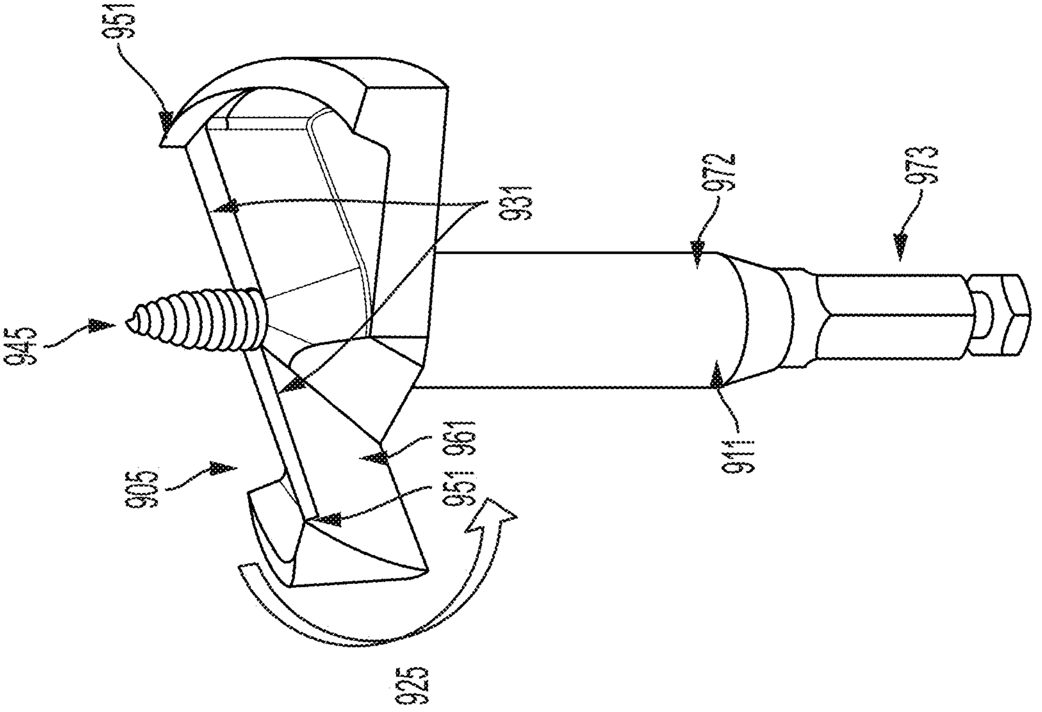
FIG. 10 is a perspective view illustrating the self-feed bit system of FIG. 9 positioned on a shank in accordance with some embodiments of the present application.
Figure 11:
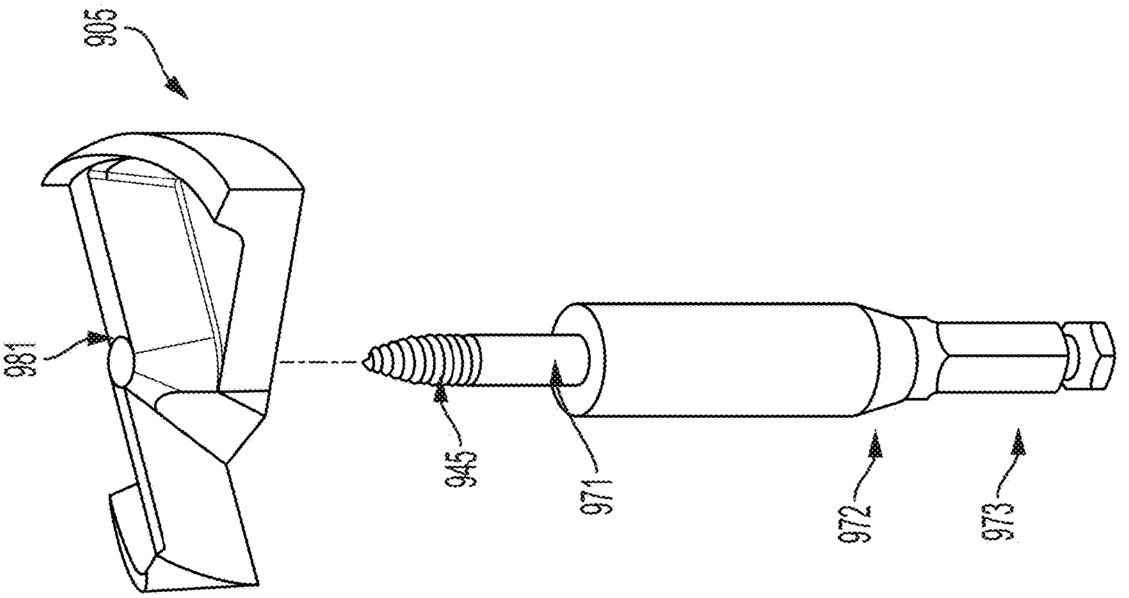
FIG. 11 is a perspective view of the self-feed bit system of FIG. 9 showing the cutting head being positioned on the shank in accordance with some embodiments of the present application.

As further illustrated in FIGS. 10 and 11, the shank 911 may further include a rear portion 973 configured to be coupled to the tool holder of the power tool (not shown), an intermediate portion 972 extending axially forward from the rear portion and a front portion 971 extending axially forward from the intermediate portion 972. As illustrated, the rear portion 973 may have a hexagonal shape, but is not limited thereto. Similarly, the intermediate 972 and front 971 portions may have a cylindrical shape, but again are not limited thereto. In some embodiments, the shank 911 may be configured to be removably and non-rotatably couplable to the cutting head 906. As further illustrated, the shank 911 may further include an integral or removable at least partially threaded tip 945 coupled to the front portion 971 and extending axially forward of the spurs 951.

As further illustrated in FIG. 10, each of the radial walls 932 include angled rake faces 961, which each have a radial cutting edge 931. The radial cutting edge 931 may either be integral with the angled rake face 961 or a separate blade that is removably attached to the angled rake face 961 without departing from the scope of the present application.

As illustrated in the exploded view of FIG. 11, a center of the cutting head 906 includes a circular central opening 981 to receive the shank 911. In some embodiments, the cutting head 906 and the shank 911 are permanently affixed together. For example, the cutting head 906 and the shank 911 may be permanently affixed together by one or more of press fitting, welding, brazing, or adhesive. However, embodiments are not limited to these methods. For example, the cutting head and/or the at least partially threaded cutting tip may be removably coupled to the shank in a tool-free manner (e.g., without use of a secondary tool), for example, using the threaded couplings described above with respect to FIGS. 1-5.

As discussed above, embodiments of the present application provide both fixed and modular embodiments. Thus, all element of the systems discussed above with respect to FIGS. 1 through 11 may be fixed in place or made to be removeable and/or replaceable without departing from the scope of the present application. Removeable and replaceable elements of the system are desirable as it reduces cost by not being required to replace the entire system.

During manufacturing, in some embodiments, the shank and the cutting head may be manufactured separately by, for example, forging, casting, machining, and the like, and then the cutting head may be removably or permanently affixed to the shank. Permanently affixing the shank to the cutting head may be done by, for example, one or more of press fitting, welding, brazing, adhesive, or the like. The modular manufacturing design may allow the shank and the cutting head to be made for a lower cost, using stronger materials.

Figure 12:
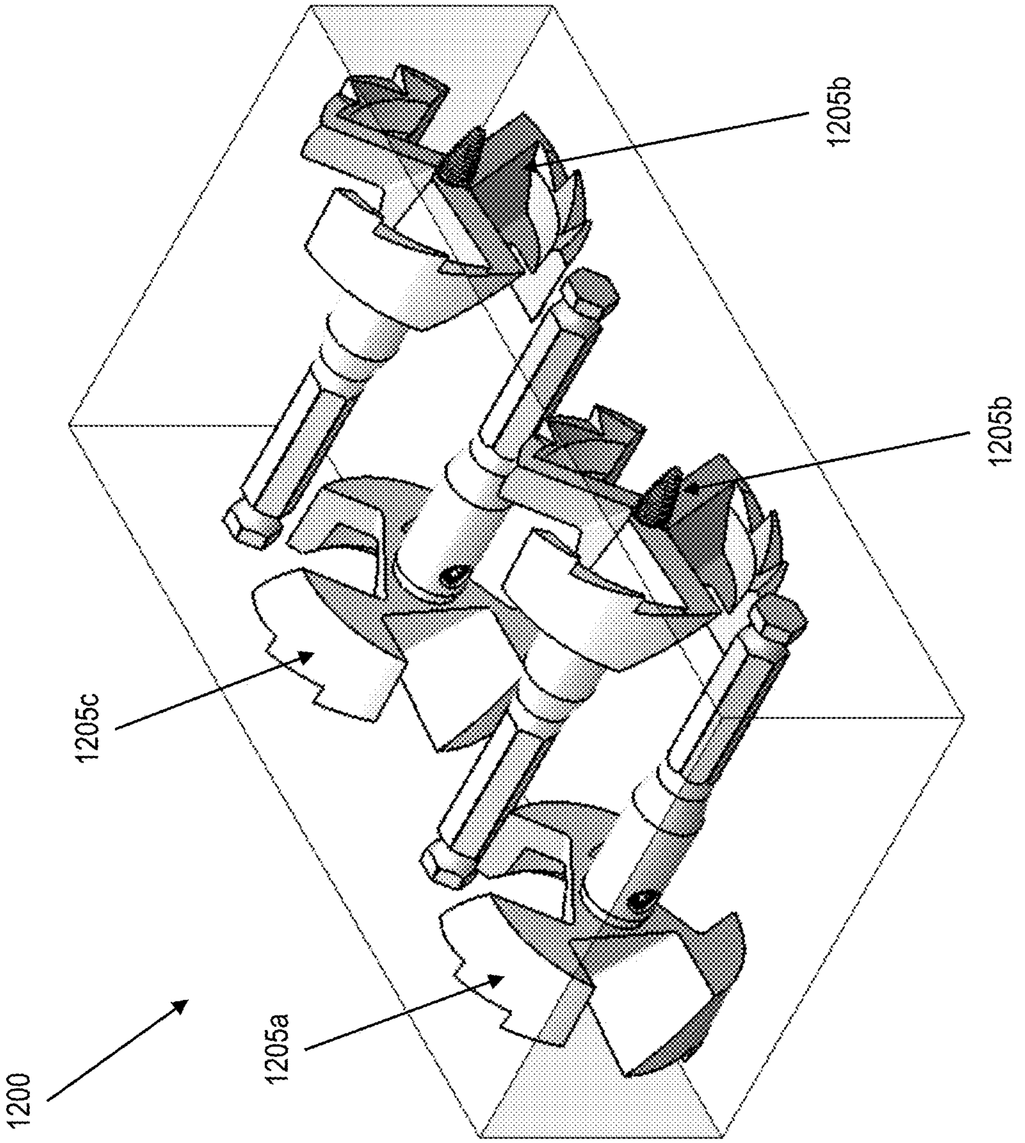
FIG. 12 is a diagram of a self-feed bit system with cutting heads and shanks arranged in an alternating nesting configuration to reduce a volume of the package in accordance with some embodiments discussed herein.

As illustrated in FIG. 12, in another embodiment self-feed bit systems of the types described above may be included in a package 1200. In embodiments illustrated in FIG. 12, a plurality of self-feed bits 1210*a*, 1210*b*, 1210*c*, 1210*d* are packaged in an alternating nested pattern to reduce volume of the package 1200. It will be understood that these self-feed bits may have different cutting heads to suit different projects. Furthermore, although four self-feed bits 1200*a*-1200*d* are shown, embodiments are not limited thereto. For example, less than or more than four self-feed bits in a package 1200 may be provided without departing from the scope of the present application. A self-feed bit system including a shank with an integral threaded tip may reduce the likelihood that the threaded tip will come loose or fall off. In some embodiments, the shank includes a rear hex shaped portion, a larger diameter cylindrical intermediate portion, and a smaller diameter cylindrical front portion that is integrally formed with the threaded tip. In the illustrated embodiments, the cutting head has two sector-shaped base walls, each extending at most approximately 90° (e.g., approximately) 20-45° around the circumference of a circle (as opposed to 360° in traditional self-feed bits). Making the base walls sector shaped may reduce the amount of torque needed to cut a hole. The base walls are each bounded on their peripheral edge by a peripheral wall extending axially forward from the base and including a cutting spur at a leading corner of the peripheral wall facing in the cutting direction. The cutting spurs may allow the formation of cleaner holes and require lower effort to punch through the end of a hole. The base walls are also each bounded along their leading radial edge by angled rake faces, each having a radial cutting edge, which may be integral with the rake face or may be on a separate blade that is removably attached to the rake face.

Figure 13:
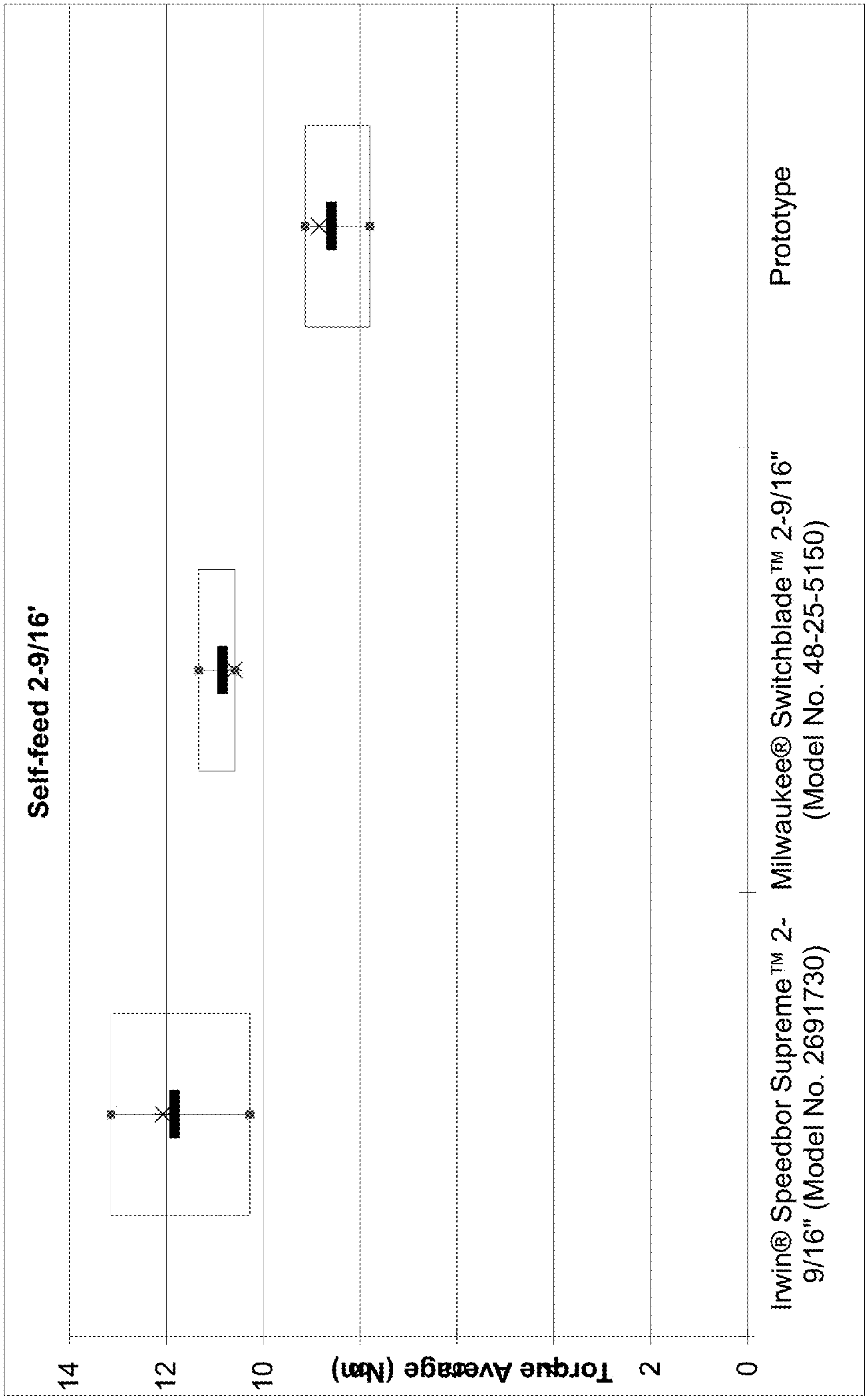
FIGS. 13 and 14 are graphs illustrating an amount of torque required to form holes using the self-feed bit systems in accordance with the present application.
Figure 14:
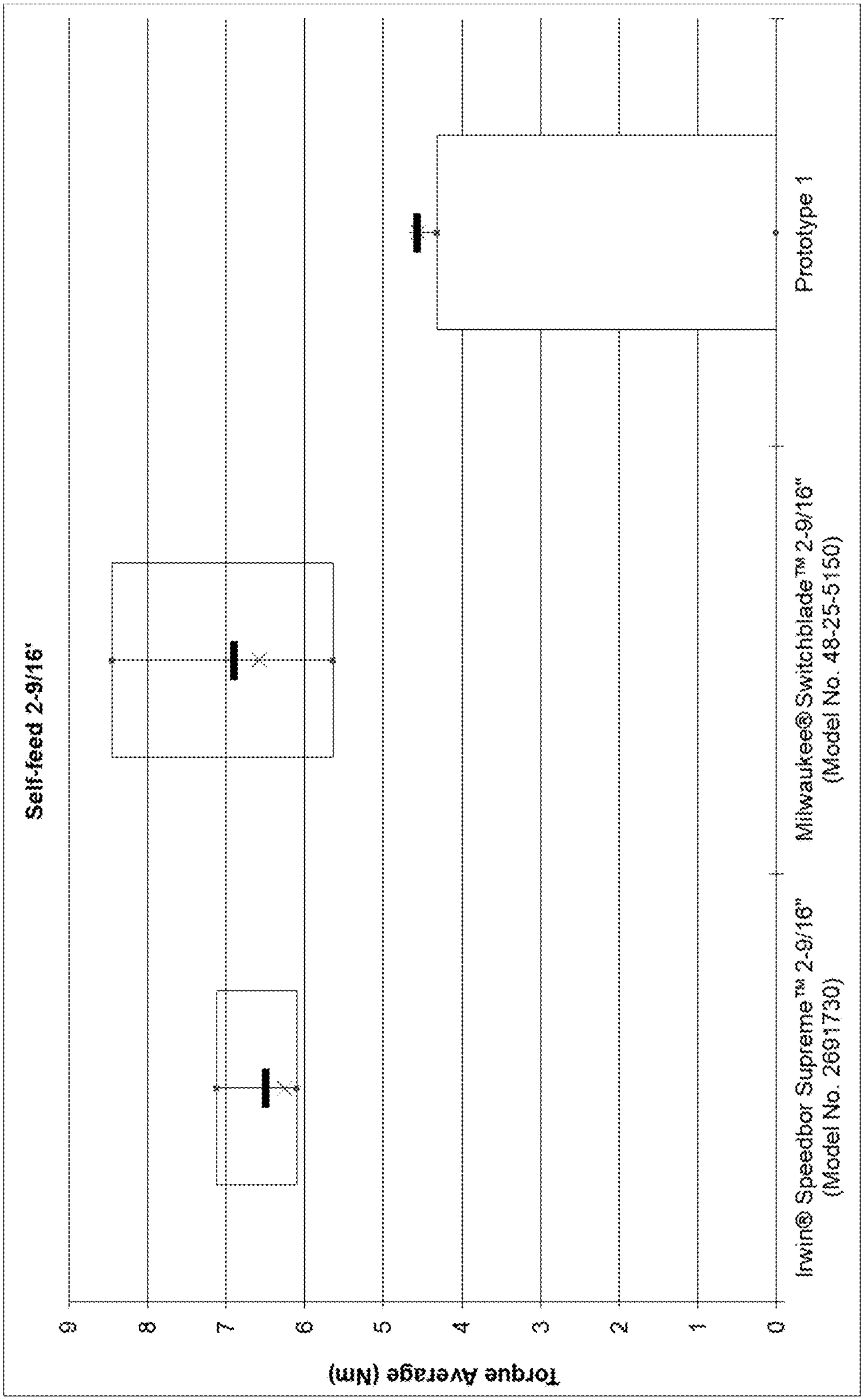

The self-feed bit systems of the present application are able to achieve significantly reduced torque when forming a hole in a workpiece as compared to existing self-feed bits. For example, as shown in FIG. 13, a prototype self-feed bit of the type shown in FIGS. 5A-5B with a diameter of 2⁹⁄₁₆" was compared against an Irwin® Speedbor Supreme™ 2⁹⁄₁₆" self-feed bit (model no. 2691730), sold by Irwin Industrial Tool Co. and a Milwaukee® Switchblade™ 2⁹⁄₁₆" self-feed bit (model no. 48-25-5150), sold by Milwaukee Electric Tool Corp., when drilling holes in 2" thick pine using a DEWALT 20V MAX Cordless Brushless ⁷⁄₁₆ in. Quick Change Stud and Joist Drill (model no. DCD445), sold by DEWALT Industrial Tool Co. Unlike the prototype bit, the Irwin self-feed bit and the Milwaukee self-feed bit have a threaded tip with a higher thread pitch, peripheral teeth that are higher in height than the cutting blade, and high speed steel teeth instead of carbide or cermet. The Irwin self-feed bit, the Milwaukee self-feed bit, and the prototype self-feed bit had an average drilling torque of approximately 11.8 Nm, 10.8 Nm, and 8.6 Nm, respectively. Thus, the prototype had approximately 27% and 20% improvement over the Irwin and Milwaukee self-feed bits, respectively.

As shown in FIG. 13, the same prototype self-feed bit was compared against the same Irwin and Milwaukee bits int eh same test, but instead using a DEWALT 20V MAX Brushless Cordless ½-in Hammer Drill Driver (model no. DCD999). The Irwin self-feed bit, the Milwaukee self-feed bit, and the prototype self-feed bit had an average drilling torque of approximately 6.5 Nm, 6.9 Nm, and 4.6 Nm, respectively. Thus, the prototype had approximately 29% and 34% improvement over the Irwin and Milwaukee self-feed bits, respectively.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

In the specification, there have been disclosed embodiments of the application and, although specific terms are used, they are used in a generic and descriptive sense only and not for purposes of limitation.

What is claimed is:

1. A self-feed bit system, comprising:

a shank extending along an axis and configured to be coupled to a tool holder of a power tool;

a cutting head couplable to the shank and including a sector shaped base, a radially extending lip at a leading edge of the sector shape facing in a cutting direction, the lip including a rake face facing the cutting direction at a rake angle relative to the axis;

a radially extending cutting blade coupled to the radially extending lip and extending axially forward from the base at a first height measured in an axial direction relative to a bottom of the base; and an at least partially threaded tip coupled to the shank and extending axially forward of the cutting blade;

two or more teeth positioned on a perimeter of the base trailing the cutting blade, each tooth extending axially forward from the base at a second height measured in an axial direction relative to a bottom of the base, the second height being less than the first height.

2. The self-feed bit system of claim 1, wherein the first height is approximately one-half inch greater than the second height.

3. The self-feed bit system of claim 1, wherein the sector shaped base extends around at least 180° and at most 300° of a circumference of a circle.

4. The self-feed bit system of claim 1, wherein the cutting blade is removably coupled to the lip to facilitate replacement of the cutting blade.

5. The self-feed bit system of claim 4, wherein the at least partially threaded tip is removably coupled to the shank.

6. The self-feed bit system of claim 1, wherein the at least partially threaded tip includes a thread having a pitch of less than or equal to 1.2 mm.

7. The self-feed bit system of claim 6, wherein the rake angle is at least 40°.

8. The self-feed bit system of claim 7, wherein the teeth comprises carbide or cermet.

9. The self-feed bit system of claim 7, wherein the cutting blade comprises carbide or cermet.

10. The self-feed bit system of claim 1, wherein the cutting head is integral with the shank.

11. The self-feed bit system of claim 1, wherein the cutting head is removably coupled to the shank in a tool-free manner.

12. The self-feed bit system of claim 11, wherein the cutting head comprises two or more removeable and interchangeable cutting heads having different diameters or features that are interchangeably coupleable to a front end of the shank.

13. The self-feed bit system of claim 12, wherein the cutting head includes a first threaded portion and the shank includes a second threaded portion that may be threadably attached to the first threaded portion to removably couple the cutting head to the shank.

14. The self-feed bit system of claim 13, wherein the first threaded portion comprises a threaded stub extending axially rearward of the cutting head and the second threaded portion includes a threaded collar configured to be threaded to the threaded stub and coupled to the shank.

15. A self-feed bit system, comprising:

a shank extending along an axis and configured to be coupled to a tool holder of a power tool;

a cutting head couplable to the shank and including a sector shaped base, a radially extending lip at a leading edge of the sector shape facing in a cutting direction, the lip including a rake face facing the cutting direction at a rake angle relative to the axis;

a radially extending cutting blade coupled to the radially extending lip and extending axially forward from the base at a first height measured in an axial direction relative to a bottom of the base; and an at least partially threaded tip coupled to the shank and extending axially forward of the cutting blade, wherein the cutting head is removably couplable to the shank in a tool-free manner.

16. The self-feed bit system of claim 15, wherein the cutting head includes a first threaded portion and the shank includes a second threaded portion that may be threadably attached to the first threaded portion to removably couple the cutting head to the shank.

17. The self-feed bit system of claim 16, wherein the first threaded portion comprises a threaded stub extending axially rearward of the cutting head and the second threaded portion includes a threaded collar configured to be threaded to the threaded stub and coupled to the shank.

18. The self-feed bit system of claim 15, wherein the cutting head comprises a plurality of removable and interchangeable cutting heads, and further comprising a package inside of which the shank and the plurality of the one or more removable and interchangeable cutting heads are packaged with the plurality of cutting heads lying flat within the package.

19. A self-feed bit system, comprising:

a shank extending along an axis and configured to be coupled to a tool holder of a power tool;

a cutting head couplable to the shank and including a sector shaped base, a radially extending lip at a leading edge of the sector shape facing in a cutting direction, the lip including a rake face facing the cutting direction at a rake angle relative to the axis, wherein the rake angle is at least 40°;

a radially extending cutting blade coupled to the radially extending lip and extending axially forward from the base at a first height measured in an axial direction relative to a bottom of the base; and an at least partially threaded tip coupled to the shank and extending axially forward of the cutting blade wherein the at least partially threaded tip includes a thread having a pitch of less than or equal to 1.2 mm;

two or more teeth positioned on a perimeter of the base trailing the cutting blade, each tooth extending axially forward from the base at a second height measured in an axial direction relative to a bottom of the base, wherein the teeth comprise carbide or cermet.

20. The self-feed bit system of claim 19, wherein the cutting head is removably coupled to the shank in a tool-free manner.

* * * * *